J. L. STRAIT.
Seed Planter.

No. 98,313.

Patented Dec. 28, 1869.

WITNESSES:
Alex. F. Roberts
Frank Blockley

INVENTOR:
J. L. Strait
by
Munn & Co.
attorneys

United States Patent Office.

J. L. STRAIT, OF COOKSVILLE, MISSISSIPPI.

Letters Patent No. 98,313, dated December 28, 1869.

IMPROVEMENT IN SEED-PLANTER.

The Schedule referred to in these Letters Patent and making part of the same.

*To all whom it may concern:*

Be it known that I, J. L. STRAIT, of Cooksville, in the county of Noxubee, and State of Mississippi, have invented a new and improved Seed-Planter; and I do hereby declare that the following is a full, clear, and exact description thereof, which will enable those skilled in the art to make and use the same, reference being had to the accompanying drawings, forming part of this specification.

Similar letters of reference indicate corresponding parts.

My invention has for its object to furnish a simple, convenient, effective, and inexpensive machine for planting cotton-seed, corn, peas, &c., which shall be so constructed as to be conveniently adjusted to plant the seeds in hills or drills, and in greater or less quantities, as may be desired; and It consists in the construction and combination of the various parts of the machine, as hereinafter more fully described.

A are the side beams of the machine, the forward ends of which incline inward, and are securely bolted, or otherwise attached to each other.

Figure 1:
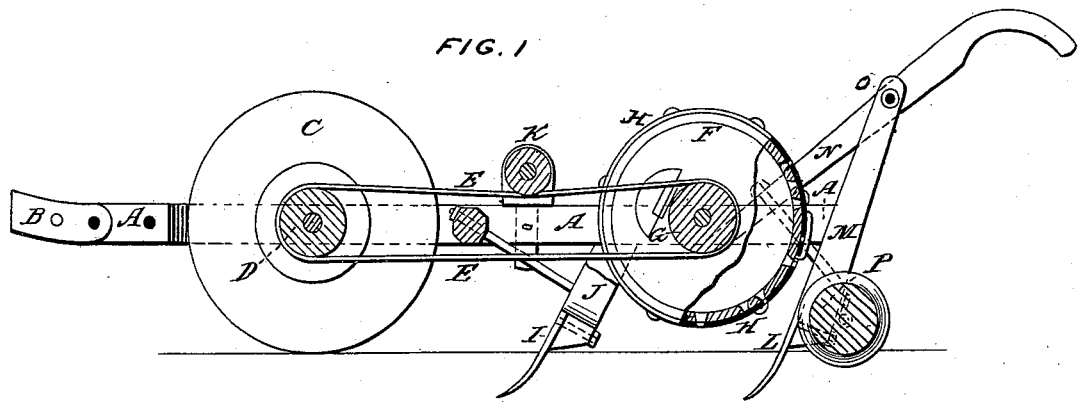
Figure 1 is a detail longitudinal section of my improved planter, taken through the line x-x, fig. 2.

B is the tongue, the rear end of which enters and is pivoted in a recess formed in the forward ends of the beams A, and which is kept from dropping down too far by a shoulder formed upon said tongue, and striking against the forward ends of the said beams, as shown in fig. 1.

C is the drive-wheel or roller, which is pivoted to and between the side beams A, just in the rear of the bent forward ends of said beams, and to the ends of which are attached or upon them are formed pulleys, D, to receive the bands E, by means of which the dropping-cylinder F is operated.

The dropping-cylinder F is pivoted to and between the rear parts of the side beams A, and to its ends are attached or upon them are formed pulleys, G, to receive the bands E, by which the said dropping-cylinder F is revolved.

The dropping-cylinder F is formed by attaching sole-leather, or its equivalent, to two circular disks.

In the middle part of the sides of the cylinder F is formed a number of holes or perforations, for the escape of the seeds.

H is a band, clasped around the middle or perforated part of the cylinder F, and which is perforated with holes corresponding in shape and size with the holes through the cylinder F.

The perforations of the cylinder F and of the band H are so arranged that when the band H is arranged in one position, a large number of the perforations will be uncovered, dropping the seed in drills.

By sliding the band H a little to one side, another lesser number of perforations will be uncovered, dropping the seeds in hills; and by sliding the band a little further, a still less number of the perforations will be uncovered, the uncovered perforations in each case being equally distant from each other.

By slightly moving the band H in either of its positions, the size of the holes for discharging the seeds may be enlarged or diminished, at will.

This construction adapts the machine for planting different kinds and sizes of seeds, and planting them in drills or in hills, at a greater or less distance apart, as may be desired.

I is the plow, for opening the soil to receive the seed.

The opening plow I is placed in front of the dropping-cylinder F, and in the rear of the roller or drive-wheel C.

The opening plow I is attached to the lower part of the semicircular or curved standard J, whose ends are attached to the beams A upon each side of the forward part of the dropping-cylinder F, so as to protect the said cylinder from being injured by stumps, clods, and other obstructions that might otherwise strike against it.

K is an idler, attached to eye-bolts, or other adjustable supports, passing down through the beams A in such positions that the said idler may be made to bear more or less upon the bands E, to keep them sufficiently taut.

L are covering shovel-plows, attached to the lower ends of the standards M, in the rear of the cylinder F.

The standards M are attached to the rear ends of the beams A, and their upper ends extend upward, and are connected with the handles N by the round O to support the said handles.

The lower ends of the handles N are attached to the beams A in the ordinary manner.

The draught-strain upon the standards M is supported by inclined brace-rods, as shown in the drawings.

Figure 2:
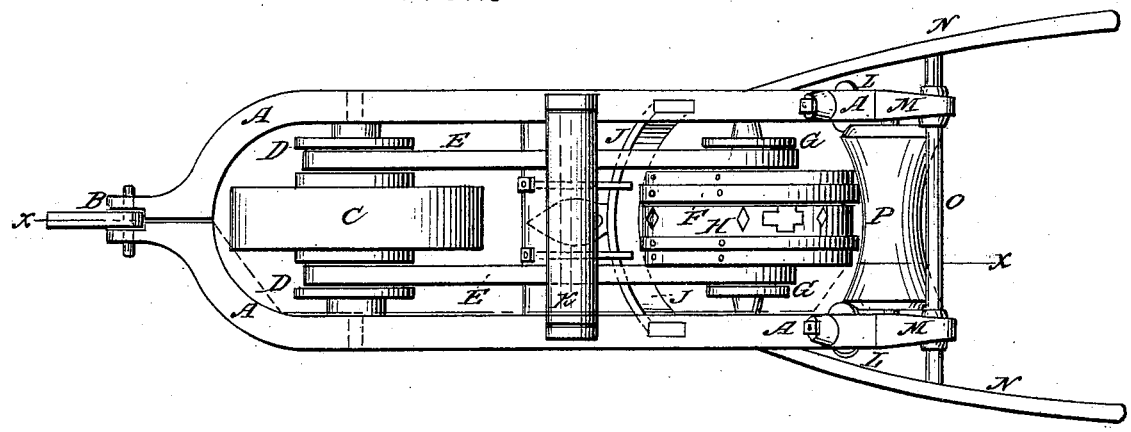
Figure 2 is a top view of the same.

P is the covering-roller, the face of which is concaved, as shown in fig. 2, and which is pivoted to the lower parts of the standards M, to press down the soil upon the seeds, and leave the ridge properly rounded.

Having thus described my invention,

What I claim as new, and desire to secure by Letters Patent, is—

1. An improved seed-planter, formed by the combination of the tongue B, side beams A, drive-roller C, pulleys D, bands E, idler K, pulleys G, dropping-cylinder F H, opening-plow, I J, coverers L M, concave roller P, and handles N, with each other, said parts being constructed and arranged substantially as herein shown and described and for the purposes set forth.

2. The forked standard J, for the opening-plow, arranged between the drive-roller C and the dropping-cylinder F H, and adapted to serve as a guard or fender for the said dropping-cylinder, substantially as herein shown and described, and for the purpose set forth.

J. L. STRAIT.

Witnesses:
S. SPENCER,
G. B. NEILL.